(12) United States Patent
Bromenshenkel et al.

(10) Patent No.: US 11,065,998 B2
(45) Date of Patent: Jul. 20, 2021

(54) HAUL TRUCK DUMP BODY FINISH MACHINED REAR PIVOT SUPPORT

(71) Applicant: Caterpillar Inc., Peoria, IL (US)

(72) Inventors: Timothy J. Bromenshenkel, Tuscola, IL (US); Mark A. Wagner, Taylorville, IL (US)

(73) Assignee: Caterpillar Inc., Peoria, IL (US)

(*) Notice: Subject to any disclaimer, the term of this patent is extended or adjusted under 35 U.S.C. 154(b) by 89 days.

(21) Appl. No.: 16/663,627

(22) Filed: Oct. 25, 2019

(65) Prior Publication Data

US 2021/0122282 A1 Apr. 29, 2021

(51) Int. Cl.
| | |
|---|---|
| *B60R 19/34* | (2006.01) |
| *B60P 1/28* | (2006.01) |
| *B62D 65/02* | (2006.01) |
| *B62D 27/02* | (2006.01) |
| *B62D 33/02* | (2006.01) |
| *B23K 101/00* | (2006.01) |

(52) U.S. Cl.
CPC ............ *B60P 1/286* (2013.01); *B62D 27/023* (2013.01); *B62D 33/02* (2013.01); *B62D 65/02* (2013.01); *B23K 2101/006* (2018.08)

(58) Field of Classification Search
CPC .. B60P 1/286; B60P 1/28; B60P 1/283; B60P 1/045; B60P 1/16; B09B 1/00; C07C 201/02; Y10S 414/124; B01D 53/002
See application file for complete search history.

(56) References Cited

U.S. PATENT DOCUMENTS

| | | | | |
|---|---|---|---|---|
| 3,923,337 A | * | 12/1975 | Kershaw | B60P 1/286 296/183.2 |
| 3,938,238 A | * | 2/1976 | Kershaw | B60P 1/286 29/469 |
| 4,162,096 A | * | 7/1979 | Proeschl | B60P 1/286 296/193.04 |
| 4,230,254 A | * | 10/1980 | Proeschl | B60P 1/286 228/182 |
| 4,474,404 A | * | 10/1984 | Hagenbuch | B60P 1/286 266/165 |
| 4,826,233 A | * | 5/1989 | Hagenbuch | B60P 1/286 266/165 |

(Continued)

FOREIGN PATENT DOCUMENTS

| | | |
|---|---|---|
| CN | 203766581 | 8/2014 |
| CN | 102815249 | 3/2015 |

(Continued)

*Primary Examiner* — Kiran B Patel
(74) *Attorney, Agent, or Firm* — Xsensus LLC (57) ABSTRACT

A finish machined rear pivot support a dump body of a haul truck can comprise a pair of rear pivots spaced apart from each other in a first direction, and a cross-member extending in the first direction between the rear pivots. The rear pivots can be respectively welded in-line with longitudinal support body members on a bottom of the dump body. The cross-member can extend from inward-facing sides of the rear pivots. Each of the rear pivots can include two cut-outs spaced apart from each other in a second direction perpendicular to the first direction. The cut-outs can be provided over corresponding one of transverse support body members on the bottom of the dump body.

20 Claims, 7 Drawing Sheets

(56) References Cited

U.S. PATENT DOCUMENTS

| | | | |
|---|---|---|---|
| 6,935,678 B1 * | 8/2005 | Laban | B60P 1/286 296/183.1 |
| 8,635,754 B2 | 1/2014 | Hagenbuch | |
| 9,751,445 B1 | 9/2017 | Arul et al. | |
| D885,975 S * | 6/2020 | Hettinger | D12/15 |
| D886,673 S * | 6/2020 | Hettinger | D12/15 |
| 2002/0074848 A1 | 6/2002 | Feuereisen Azocar | |
| 2002/0180240 A1 * | 12/2002 | Fujan | B60P 1/283 296/183.2 |
| 2003/0178883 A1 | 9/2003 | Hinds et al. | |
| 2007/0046068 A1 * | 3/2007 | D'Amico | B62D 33/02 296/183.1 |
| 2007/0069569 A1 * | 3/2007 | D'Amico | B60P 1/286 298/7 |
| 2007/0182208 A1 * | 8/2007 | D'Amico | B60P 1/286 296/183.1 |
| 2013/0043701 A1 * | 2/2013 | Hagenbuch | B60P 1/286 296/184.1 |
| 2013/0234468 A1 * | 9/2013 | Hall | B60P 1/286 296/183.2 |
| 2013/0255083 A1 * | 10/2013 | Hagenbuch | B62D 25/20 29/897.1 |
| 2014/0015279 A1 * | 1/2014 | De Paula e Silva | B62D 33/02 296/183.2 |
| 2015/0001910 A1 * | 1/2015 | Natarajan | B60P 1/286 298/1 H |
| 2015/0165957 A1 * | 6/2015 | Sarangapani | B60P 1/286 296/183.2 |
| 2015/0375609 A1 * | 12/2015 | Mirzaei | B60L 7/02 298/17 R |
| 2017/0066359 A1 | 3/2017 | Rissman et al. | |
| 2018/0312097 A1 * | 11/2018 | Petrie | B60P 1/283 |
| 2019/0337437 A1 * | 11/2019 | Cusack | B60P 1/283 |
| 2020/0039413 A1 * | 2/2020 | Arul | B60P 1/04 |

FOREIGN PATENT DOCUMENTS

| | | |
|---|---|---|
| CN | 205800879 | 12/2016 |
| CN | 108146316 | 6/2018 |
| CN | 209141984 | 7/2019 |

* cited by examiner

HAUL TRUCK DUMP BODY FINISH MACHINED REAR PIVOT SUPPORT

TECHNICAL FIELD

The present disclosure relates to haul trucks, and more particularly to a finish machined rear pivot support for a dump body of a haul truck, and systems, components, and method thereof.

BACKGROUND

Off-highway haul truck bodies typically are supported by pivot locations at the rear of the truck frame. The dump body support pivots for the pivot locations may be bored either independent of each other or when the final dump body is completely welded. This can lead to decrease in efficiency of the production cycle because the boring machinery typically is located and operated in a relatively large location due to the relatively large size of the boring machinery and typically requires large crane capacity.

U.S. Patent Pub. No. 2017/0066359 ("the '359 publication") describes a pivot connection or hinge structure for a truck body of a dump truck. The '359 publication describes that each pivot connection is provided on a bottom of the truck body, whereby the pivot connection is secured by welding or other known securing arrangements to one of the chassis rails of the truck body. The '359 publication also shows a plurality of ribs running through the pivot connections and the chassis rails.

SUMMARY OF THE DISCLOSURE

In one aspect, a finish machined rear pivot support is disclosed. The finish machined rear pivot support can comprise a pair of rear pivots spaced apart from each other in a first direction, the rear pivots being configured to be respectively welded in-line with longitudinal body support members on a bottom of a dump body; and a cross-member extending in the first direction between the rear pivots, the cross-member being welded to inward-facing sides of the rear pivots. Each said rear pivot includes two cut-outs spaced from each other in a second direction perpendicular to the first direction, and the two cut-outs of each of the rear pivots are provided on opposite sides of the cross-member in a side view of the finish machined rear pivot support.

In another aspect, a haul truck dump body is disclosed. The haul truck dump body can be comprised of a body portion having a length and a width and a top configured as a receptacle to receive hauling material; longitudinal body support members provided on a bottom of the dump body portion, the longitudinal body support members being spaced apart from each other in a width direction of the dump body portion and running parallel to each other in a length direction of the dump body portion from a front portion of the dump body portion to a rear portion of the dump body portion; transverse body support members provided on the bottom of the body portion, the transverse body support members being spaced apart from each other in the length direction of the dump body portion and running in the width direction of the dump body from a first side of the dump body portion to a second side of the dump body portion opposite the first side, the transverse body support members running perpendicular to the longitudinal body support members; and a finish machined rear pivot support welded in-line with the longitudinal body support members. The finish machined rear pivot support can include a pair of rear pivots spaced apart from each other in the width direction of the body portion, the rear pivots being respectively welded in-line with the longitudinal body support members, and a cross-member provided between the rear pivots and the transverse body support members, the cross member being welded to inward-facing sides of the rear pivots and running parallel to the transverse body support members.

And in yet another aspect, a method is disclosed. The method can be comprised of providing a dump body, providing a finish machined rear pivot support, and welding the provided finish machined rear pivot support in line with longitudinal body support members provided on a bottom of the dump body. Rear pivots of the finish machined rear pivot support, at the time of welding the finish machined rear pivot support in line with the longitudinal body support members, each has a pivot bore configured to pivotally connect a rear frame connection of a space frame on which the dump body is to be operatively positioned. The dump body can include a body portion having a top configured as a receptacle to receive hauling material, the longitudinal body support members provided on the bottom of the dump body portion, the longitudinal body support members being spaced apart from each other in a width direction of the dump body portion and running from a front portion of the dump body portion to a rear portion of the dump body portion, and a pair of transverse body support members provided on the bottom of the body portion, the transverse body support members being spaced apart from each other in the length direction of the dump body portion and running in the width direction of the dump body from a first side of the dump body portion to a second side of the dump body portion opposite the first side. The finish machined rear pivot support can include the rear pivots spaced apart from each other in the width direction of the body portion, and a cross-member provided between the rear pivots and the transverse body support members.

Other features and aspects of this disclosure will be apparent from the following description and the accompanying drawings.

DETAILED DESCRIPTION

Figure 1:
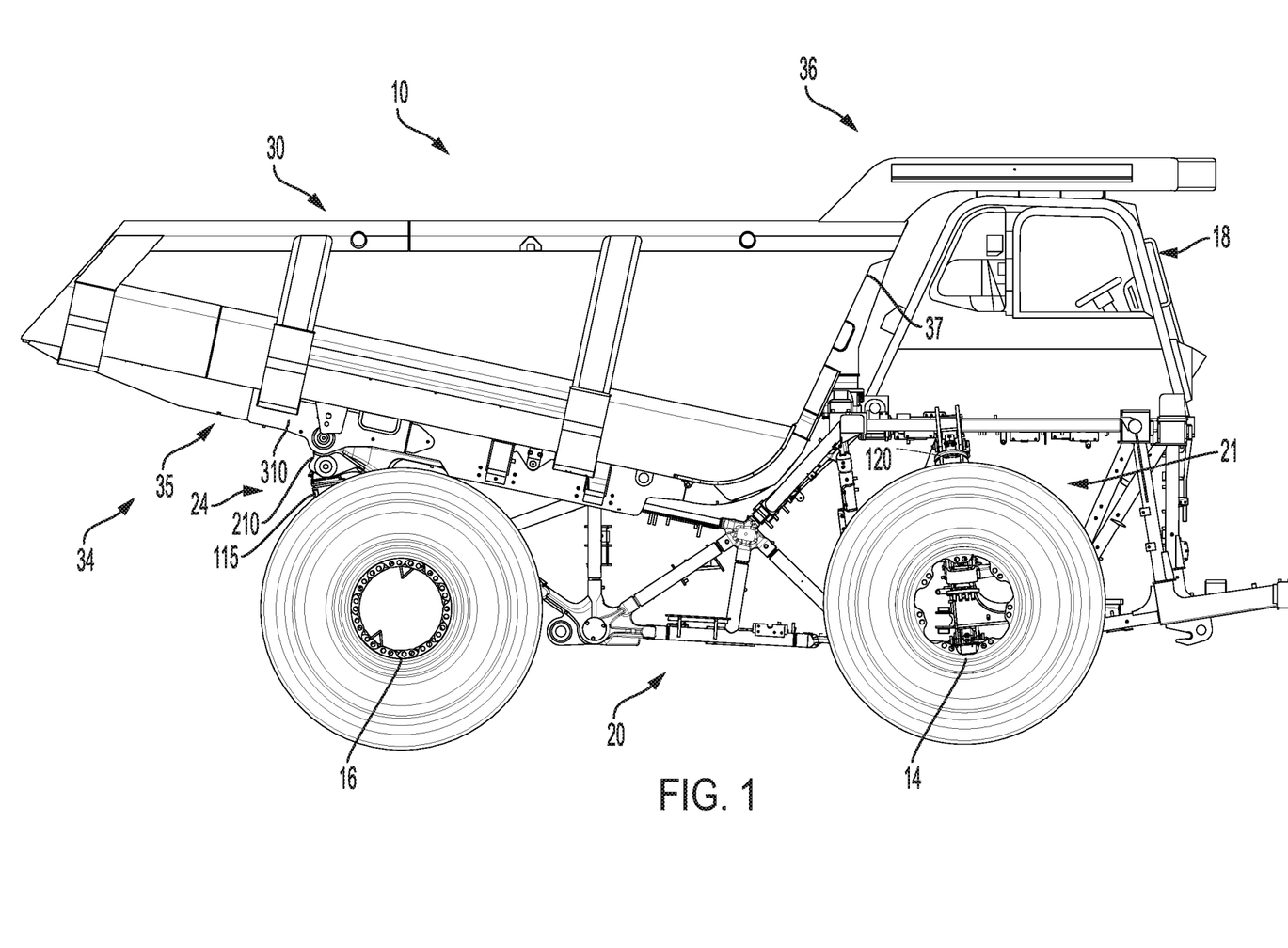
FIG. 1 is a side view of a machine according to embodiments of the disclosed subject matter.
Figure 2:
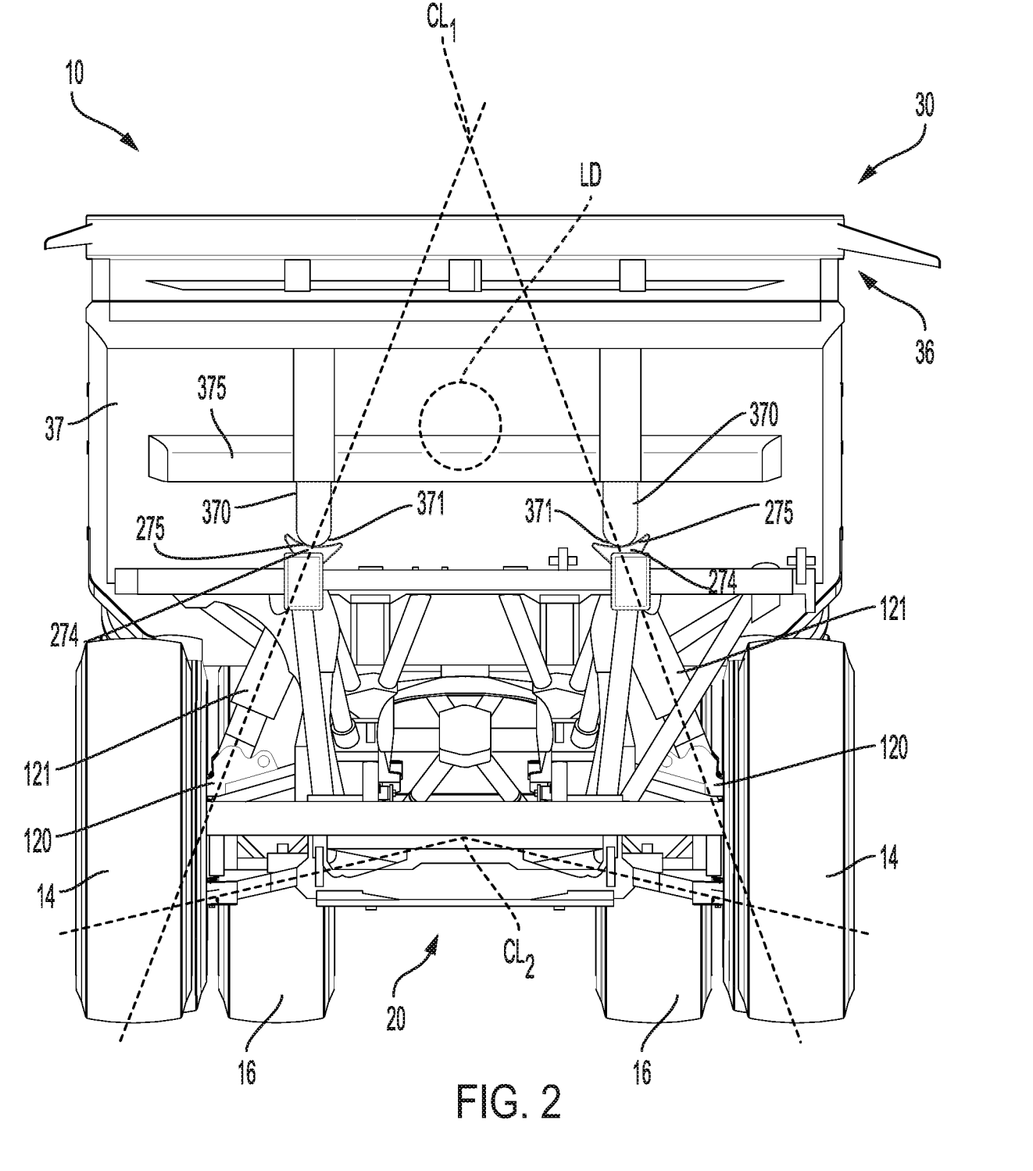
FIG. 2 is a front view of the machine of FIG. 1 with an operator cabin thereof removed to show a space frame and a dump body thereof according to embodiments of the disclosed subject matter.

Referring now to the drawings and with specific reference to FIG. 1 and FIG. 2, these figures illustrate an exemplary embodiment of a machine 10. Machine 10 may be a mobile machine that performs some type of operation associated with an industry such as mining, construction, or any other industry known in the art. For example, as shown in FIG. 1 and FIG. 2, machine 10 may be an earth moving machine, particularly, an off-highway rear haul truck 10.

Machine 10 may have a space frame 20 supported by front wheels 14 and rear wheels 16 (including respective tires). The front and rear wheels 14, 16 may be connected to space frame 20 by front suspension members and rear suspension systems, respectively. Machine 10 may also include a bed or body 30 supported by the space frame 20. Such bed or body 30 may be referred to herein as a dump body 30. The dump body 30 can be configured as a receptacle to receive hauling material.

A rear portion 34 of the dump body 30 can be pivotably coupled or attached to a portion (including portions) at a rear 24 of the space frame 20. Discussed in more detail below, portions of the dump body 30 between the rear portion 34 and a front portion 36 of the dump body 30 can be movably positioned relative to respective portions of the space frame 20 to support the dump body 30 on the space frame 20 at a rest position of the dump body 30. The rest position of the dump body 30 may be considered as positioning of the dump body 30 such that the front portion 36 of the dump body 30 is at a lower-most position (i.e., not raised). The dump body 30 can be pivoted at the rear portion 34 about the rear 24 of the space frame 20 to raise or lower the portion of the dump body 30 in front of the pivot (and hence move the portion of the dump body 30 behind the pivot in the opposite direction). Such pivoting of the dump body 30 to raise the front portion 36 of the dump body 30 can be to dump content from within the dump body 30. Likewise, pivoting of the dump body 30 to lower the front portion 36 of the dump body 30 to the rest position can be to receive content in the dump body 30.

Machine 10 may have an operator cabin 18 supported by the space frame 20. Machine 10 may also be equipped with a steering mechanism and controls to move the machine 10 and controls to raise and lower dump body 30. The steering mechanism and the controls may be located within the operator cabin 18 of the machine 10.

Machine 10 may have a prime mover (not expressly shown) supported by the space frame 20. Generally, the prime mover may be provided in a space 21 of the space frame 20. The prime mover may be configured to propel the front and rear wheels 14, 16 in the forward or rearward direction. The prime mover may be lengthwise aligned on space frame 20 along a travel direction of the machine 10. One skilled in the art will recognize, however, that the prime mover may be aligned transversally. In one exemplary embodiment, the prime mover may be an internal combustion engine, which may be a two-stroke or four-stroke diesel engine, for instance. One skilled in the art will recognize, however, that the prime mover may be any other type of internal combustion engine, such as a gasoline engine or a gaseous fuel-powered engine. The prime mover may be connected to front and/or rear wheels 14, 16 via other components such as a drive train (not shown) to transfer motive power to move the front and/or rear wheels 14, 16 in a forward or rearward direction.

Exhaust from the prime mover may be output from one or more exhaust outputs (not expressly shown). Optionally, the one or more exhaust outputs may be provided generally between the operator cabin 18 and a front wall 37 of the dump body 30 such that exhaust is provided toward at least a predetermined portion of the front wall 37. A coupling (e.g., bellows) may be provided to connect the one or more exhaust outputs to the front wall 37 of the dump body 30, for instance, to a heating channel provided in or on the front wall 37 of the dump body 30 to heat the material carried in the dump body 30.

In general, a space frame according to embodiments of the disclosed subject matter, such as space frame 20, may be a frame that includes structural members connected to each other at nodes and/or joints. The structural members can include hollow tubes and/or solid tubes, and in some instances can be connected according to a triangulated structural. The structural members can be made of metal, metal alloys, or reinforced composite materials, for instance.

Figure 3:
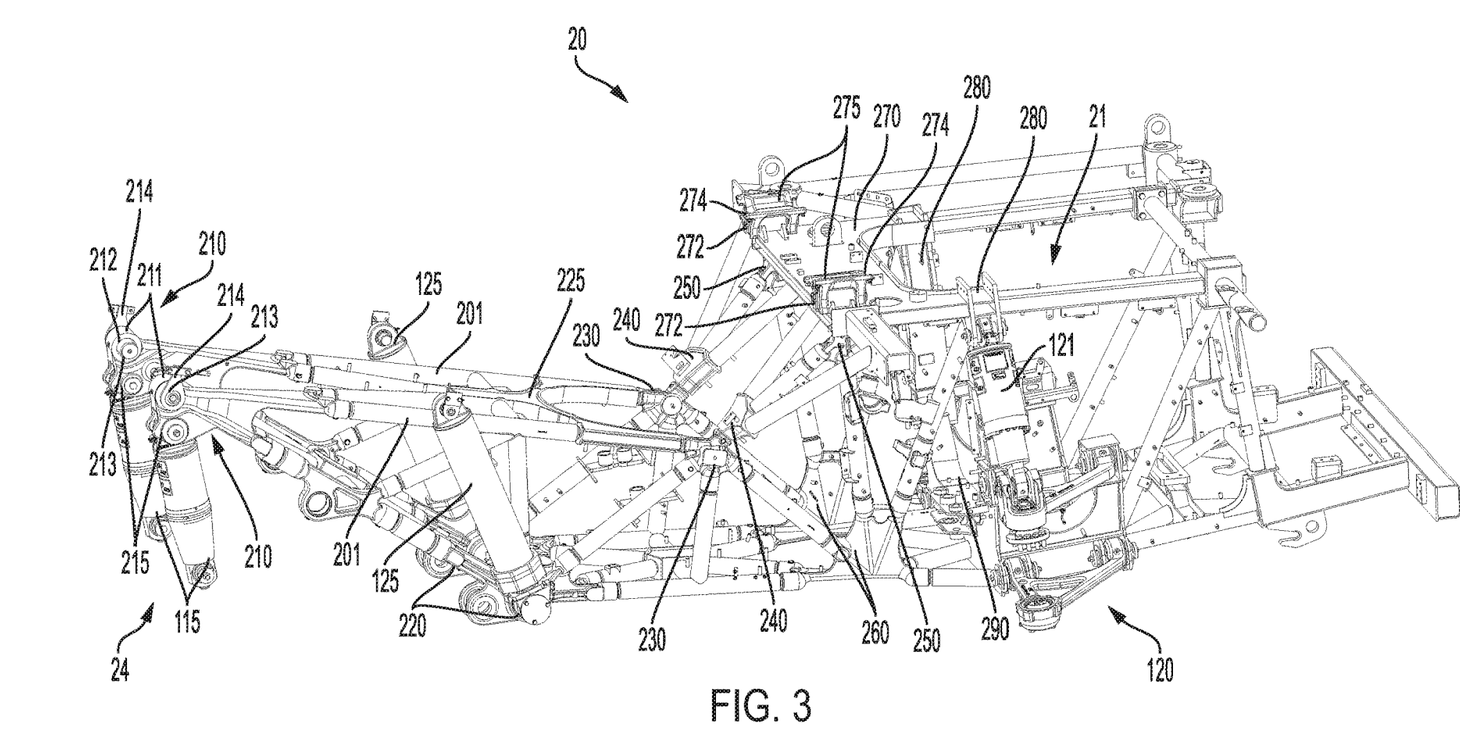
FIG. 3 is a side view of a space frame according to embodiments of the disclosed subject matter.

FIG. 3 is a more detailed view of the space frame 20. As shown, the space frame 20 can include a pair of rear frame connections 210 at the rear 24 of the space frame 20, a pair of center lower frame connections 220, a center upper horizontal frame connection 225, a pair of center upper frame connections 230, a pair of center upper frame nodal connections 240, a pair of front upper frame connections 250, a pair of front lower frame connections 260, a front upper frame connection 270, a pair of front upper suspension connections 280, and a front lower suspension connection 290. The foregoing connections can be castings or fabrications. In general, a casting may refer to a connection that is not welded to another support component of the space frame 20, and a fabrication may refer to a connection that is welded to another support component of the space frame 20.

The center lower frame connections 220 and corresponding connections can be as set forth in U.S. application Ser. No. 16/663,892 filed Oct. 25, 2019 (Case 19-0767); the center upper horizontal frame connection 225 and corresponding connections can be as set forth in U.S. application Ser. No. 16/663,930 filed Oct. 25, 2019 (Case 19-0768); the center upper frame connections 230 and corresponding connections can be as set forth in U.S. application Ser. No. 16/664,042 filed Oct. 25, 2019 (Case 19-0773); the center upper frame nodal connections 240 and corresponding connections can be as set forth in U.S. application Ser. No. 16/663,955 filed Oct. 25, 2019 (Case 19-0771); the front upper frame connections 250 and corresponding connections can be as set forth in U.S. application Ser. No. 16/664,010 filed Oct. 25, 2019 (Case 19-0772); the front lower frame connections 260 and corresponding connections can be as set forth in U.S. application Ser. No. 16/664,104 filed Oct. 25, 2019 (Case 19-0762); the front upper suspension connections 280 and corresponding connections can be as set forth in U.S. application Ser. No. 16/664,124 filed Oct. 25, 2019 (Case 19-0759); and/or the front lower suspension connection 290 and corresponding connections can be as set forth in U.S. application Ser. No. 16/664,169 filed Oct. 25, 2019 (Case 19-0760). The foregoing applications are incorporated herein by reference in their entireties.

The space frame 20 can also include a plurality of elongate support members, such as elongate support members 201. Elongate support members, according to embodiments of the disclosed subject matter, can be in the form of rods and/or tubes, circular, for instance, where some or all of the rods and/or tubes may be solid or hollow.

As shown in FIG. 3, each elongate support member 201 can be provided between the rear frame connections 210 and the front upper frame connection 270 in a top plan view of the space frame 20. More specifically, each elongate support member 201 can be provided between the center upper horizontal frame connection 225 and one of the rear frame connections 210. Further, each elongate support member 201 can extend lengthwise generally horizontally, in this case rearward from the center upper horizontal frame connection 225 at a positive acute angle relative to a horizontal plane running through the front wheels 14 and the rear wheels 16. In that the elongate support members 201 are provided at an outer portion of the space frame 20 in a width direction of the space frame 20, the elongate support members 201 may be considered outer elongate support members 201. As an example, the outer elongate support members 201 may be outer frame tubes.

Each rear frame connection 210, which may be a casting, can have a rear support 211 and a rear suspension node 215. Discussed in more detail below, the rear support 211 can directly support the dump body 30, and the rear suspension node 215 can be coupled to a rear suspension member 115 of the rear suspension system. The rear frame connections 210 can also be coupled to a plurality of elongate support members, including elongate support members 201. According to one or more embodiments of the disclosed subject matter, each of the rear frame connections 210 can be seven-point connections. For instance, according to embodiments of the disclosed subject matter, the rear frame connections 210 and corresponding connections can be as set forth in U.S. application Ser. No. 16/663,815 filed Oct. 25, 2019 (Case 19-0764), which is incorporated herein by reference in its entirety.

The rear support 211 can be configured as a pivot pin boss with a pivot pin bore or opening 212. According to one or more embodiments, an outer surface of the rear support 211 (i.e., pivot pin boss) and the pivot pin bore 212 can be cylindrical. An axis of the pivot pin bore 212 can extend in a width direction of the space frame 20. Moreover, the axes of the pivot pin bores 212 from the rear supports 211 of the pair of rear frame connections 210 may be aligned with each other. That is, the axes of the pivot pin bores 212 can be coaxial or common. The pivot pin bore 212 can be configured to receive a pivot pin of a pivot pin interface 213 such that the pivot pin interface 213 is pivotally coupled to the rear support 211 via the pivot pin bore 212 and the pivot pin interface 213 can pivot or rotate about the axes of the pivot pin bore 212 and the pivot pin of the pivot pin interface 213. Discussed in more detail below, the pivot pin interface 213 can also be coupled to a bottom 35 of the dump body 30.

As shown in FIG. 3, the front upper frame connection 270 can be fixedly coupled to the front upper suspension connections 280, and a bottom of the front upper frame connection 270 can be fixedly coupled to the front upper frame connections 250. Additionally, the front upper frame connection 270, which may be a fabrication, can have a body with a pair of rocker attachment interfaces 272 on a top surface thereof. According to one or more embodiments, the front upper frame connection 270 and corresponding connections can be as set forth in U.S. application Ser. No. 16/663,849 filed Oct. 25, 2019 (Case 19-0766), which is incorporated herein by reference in its entirety.

The rocker attachment interfaces 272 can be spaced from each other in a width direction of the space frame 20, for instance, provided at opposite outer lateral edges of the body of the front upper frame connection 270, such as shown in FIG. 3. Each rocker attachment interface 272 can have a pivot pin bore configured to receive a pivot pin. Optionally, the pivot pin can be considered part of the rocker attachment interface 272. An axis of rotation for the pivot pin bore and the pivot pin can run horizontally or substantially horizontally in a length direction of the space frame 20. Moreover, the axes of rotation for the rocker attachment interfaces 272 can be parallel to each other.

Each rocker attachment interface 272 can have rotatably attached thereto a support rocker 274 via the pivot pin. In that the rocker attachment interfaces 272 can be spaced apart from each other in the width direction of the space frame 20, so too can be the support rockers 274. Moreover, the support rockers 274 can rotate or pivot laterally or in a width direction of the space frame 20 about the respective axes of rotation defined by the rocker attachment interfaces 272.

According to embodiments of the disclosed subject matter, each support rocker 274 can have an upward-facing contact surface 275. The upward-facing contact surface 275 can be concave, for instance, semi-cylindrical, elliptical, or multi-planar. Additionally, the upward-facing contact surface 275 can be or include a padding. Discussed in more detail below, the support rockers 274, particularly the upward-facing contact surfaces 275 thereof, can receive a portion of corresponding vertical support structures 370 of the dump body 30.

Turning now to FIGS. 4-7, the dump body 30 can have, on the bottom 35 thereof, a rear pivot support 310 and a pair of flat contact surfaces 301, and on the front wall 37 thereof, a pair of vertical support structures 370.

Figure 5:
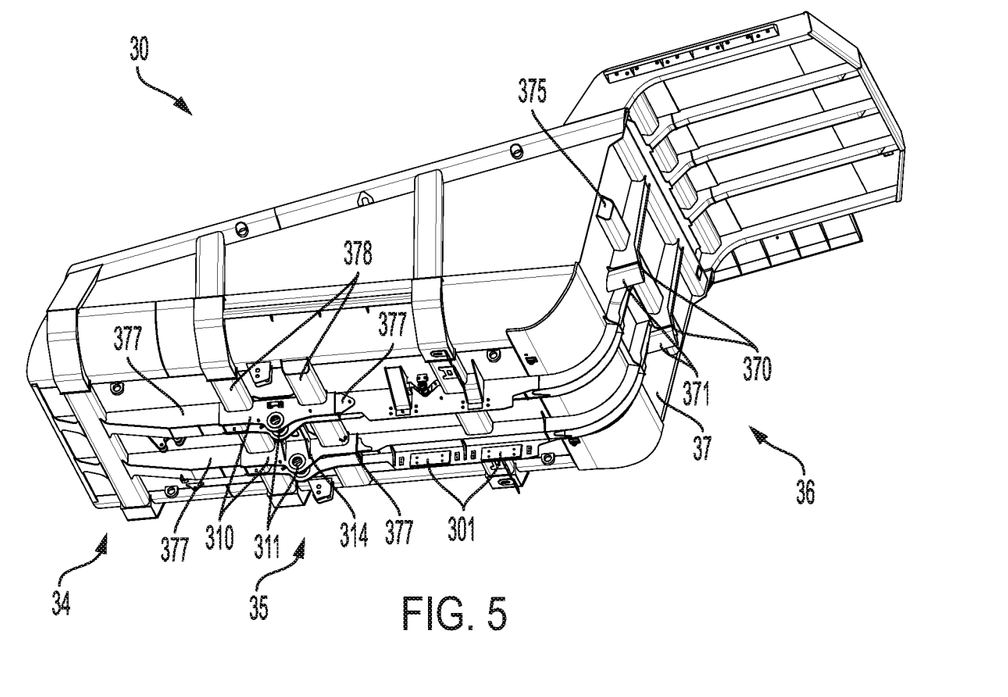
FIG. 5 is a bottom, side view of the dump body of FIG. 4.

The rear pivot support 310 can be provided at the rear portion 34 of the dump body 30, such as shown in FIG. 5. Discussed in more detail below, the rear pivot support 310 can be a finish machined rear pivot support. According to one or more embodiments, the rear pivot support 310 can be symmetrical in a front view and/or the side view thereof.

Figure 4:
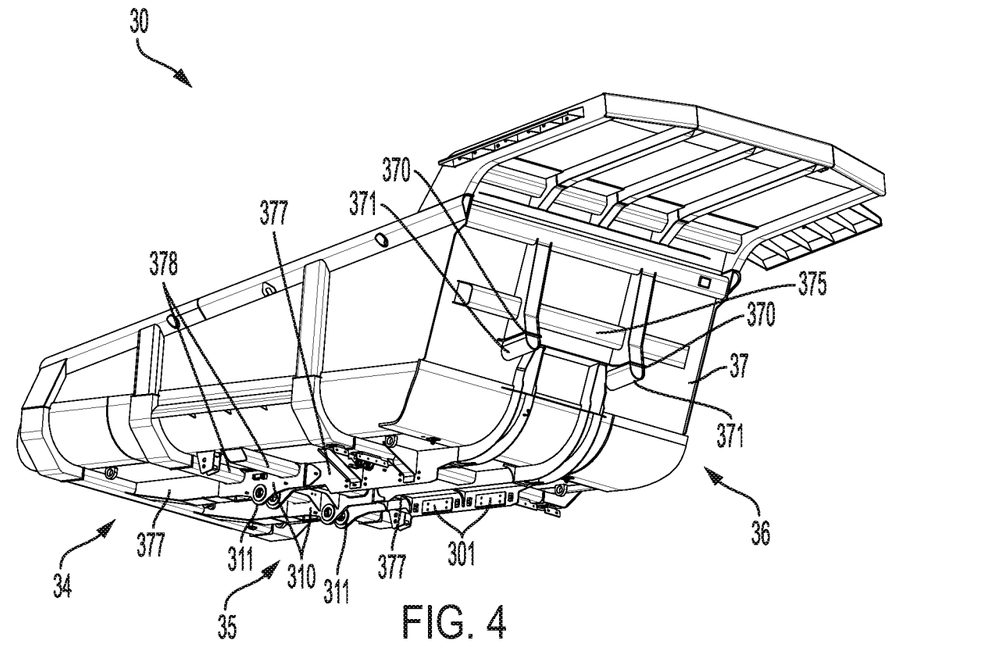
FIG. 4 is a front, side view of a dump body according to embodiments of the disclosed subject matter.
Figure 6:
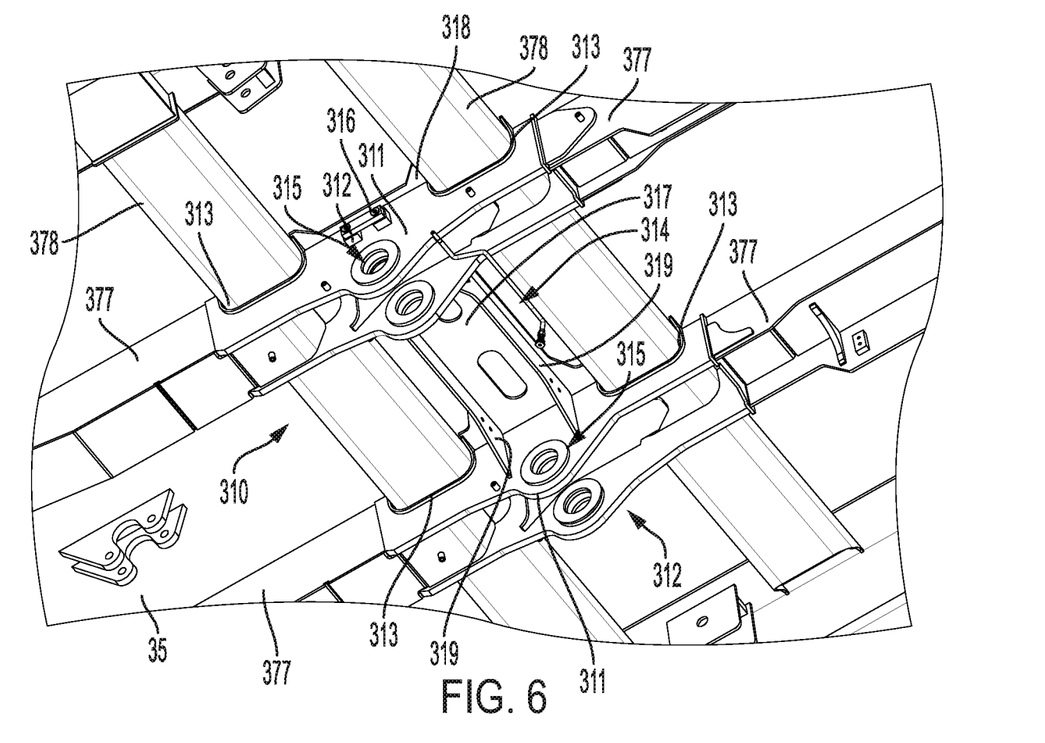
FIG. 6 is an enlarged view of a bottom portion of the dump body of FIG. 4, particularly showing a rear pivot support according to embodiments of the disclosed subject matter.

The rear pivot support 310 can have a pair of rear pivots 311. The rear pivots 311 can be spaced apart from each other in a width or lateral direction of the dump body 30, such as shown in FIGS. 4-6. A cross-member 314 can be provided between the rear pivots 311.

The rear pivot support 310 can be fixedly coupled to the bottom 35 of the dump body 30. For example, the rear pivot support 310 can be welded to the bottom 35 of the dump body 30. More specifically, according to one or more embodiments of the disclosed subject matter, each rear pivot 311 can be welded to a corresponding longitudinal body support member 377 on the bottom 37 of the dump body 30. As shown in FIG. 6, for instance, each rear pivot 311 can be welded in-line with the corresponding longitudinal body support member 377. Thus, the rear pivot 311 can be considered as part of the longitudinal body support member 377 (i.e., integral and/or one-piece with). Incidentally, the longitudinal body support members 377 can be spaced apart from each other in the width direction of the dump body 30 and can run in the length direction of the dump body 30 from the front portion 36 to the rear portion 34 of the dump body 30. According to one or more embodiments, the longitudinal support members 377 can run parallel to each other in whole or in part.

The rear pivot support 310 can also include a cross-member 314, which can be provided between the rear pivots 311. Optionally, the cross-member 314 can be provided between adjacent transverse body support members 378 provided on the bottom 35 of the dump body 30. Incidentally, the transverse body support members 378 can be spaced apart from each other in the length direction of the dump body 30 and can run in the width direction of the dump body 30, for instance, from one side of the dump body 30 to the other side of the dump body 30. Moreover, the transverse body support members 378 can run parallel to each other in whole or in part. Optionally, the cross-member 314 can run between the rear pivots 311 parallel to the transverse body support members 378.

The cross-member 314 can be fixedly connected to or considered part of the rear pivots 311 (i.e., integral and/or one-piece with). According to one or more embodiments of the disclosed subject matter, the cross-member 314 can be welded to inward-facing sides of the rear pivots, such as shown in FIG. 6. More specifically, the cross-member 314 can have a base 317 and a pair of braces 319. The braces 319, which can extend from one side of the base 317, can be spaced apart from each other in the length direction of the dump body 40. The pair of braces 319 can extend from the inward-facing sides of the rear pivots 311. Optionally, the braces 319 can be welded to the inward-facing sides of the rear pivots 311.

The side of the base opposite the side from which the braces 319 extend can be flat. According to one or more embodiments, this side can contact the bottom 37 of the dump body 30. Optionally, end portions 318 of the base 317 can extend under the rear pivots 311. In one or more embodiments, the end portions 318 can extend past the rear pivots 311, such as shown in FIG. 7.

Figure 7:
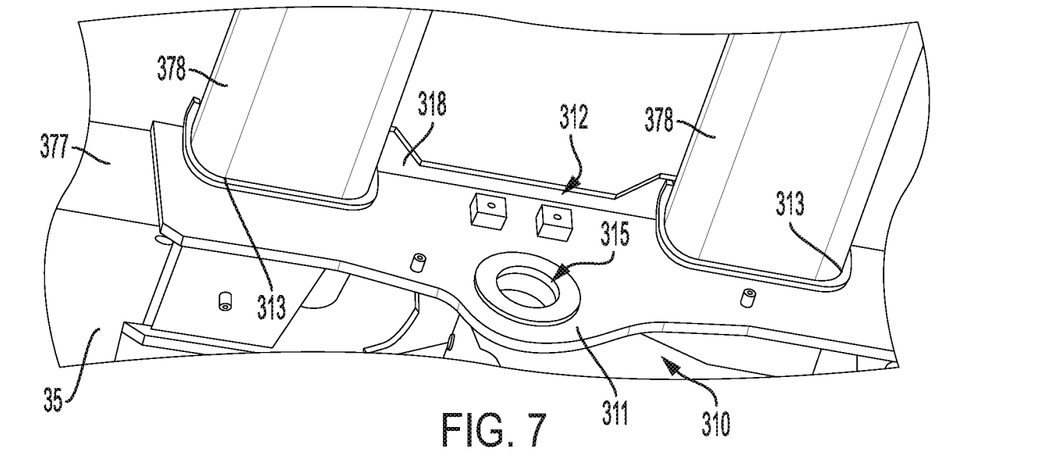
FIG. 7 shows a portion of the rear pivot support of FIG. 6.

As shown in FIG. 6 and FIG. 7, each rear pivot 311 can also include a plurality of cut-outs 313, for instance, two cut-outs 313, spaced apart from each other in the length direction of the dump body 30. Each cut-out 313 can receive or accept a transverse body support member 378. That is, each of the cut-outs 313 can extend around a corresponding transverse body support member 378. For example, according to one or more embodiments of the disclosed subject matter, each cut-out 313 can extend around the transverse body support member 378 so as to surround three sides of the transverse body support member 378. Optionally, the edges that define the end of the cut-out 313 can contact the bottom 37 of the dump body 30 on opposite sides of the transverse body support member 378. According to one or more embodiments, the two cut-outs 313 of each of the rear pivots 311 can be provided on opposite sides of the cross-member 314 in a side view of the rear pivot support 310.

The cut-outs 313 of one of the rear pivots 311 can receive different transverse body support members 378, for instance, adjacent transverse body support members 378, such as shown in FIG. 6 and FIG. 7. Additionally, as shown, each transverse body support member 378 can extend through one cut-out 313 of one rear pivot 311 and through an opposing cut-out 313 of the other rear pivot 311.

Each rear pivot 311 can have a pivot bore 315. FIG. 6, for instance, shows each rear pivot 311 having the pivot bore 315 with two aligned, pivot bore portions spaced apart from each other in the width direction of the dump body 30. Moreover, the pivot bore 315 of one rear pivot 311 can be aligned with the pivot bore 315 of the other rear pivot 311 in the width direction of the dump body 30. Thus, the pivot bores 315 can have a common axis. In that the pivot bores 315 can be circular openings, the portion (or portions) of the rear pivot 311 forming the pivot bore 315 can be considered cylindrical.

According to one or more embodiments of the disclosed subject matter, the rear pivots 311 can also include an attachment interface 312 on an outer side surface or outward-facing side thereof, such as shown in FIG. 6 and FIG. 7. As a non-limiting example, the attachment interface 312 can include a pair of projections configured to mate with corresponding notches of the pivot pin interface 213.

The rear pivots 311 can be pivotally coupled to the rear supports 211 of the space frame 20 via the pivot pin interface 213. More specifically, for each rear pivot 311/rear support 211 pair, the rear support 211 can be provided in the pivot bore 315 of the rear pivot 311 (e.g., in a space between the two pivot bore portions of a single rear pivot 311) such that the pivot bore 212 of the rear support 211 is aligned with the pivot bore 315 and such that a pin of the pivot pin interface 213 extends through the pivot bore 212 of the rear support 211 and the pivot bore 315 of the rear pivot 311. An arm 214 of the pivot pin interface 213 can have one or more notches configured to be mated with corresponding one or more projections of the attachment interface 312.

The pivot pin interface 213 can be held in place by way of the interconnection between the notches of the pivot pin interface 213 and the projections of the attachment interface 312. Moreover, the arm 214 can be fixedly coupled to the attachment interface 312. For example, a bracket 316 can be fixedly or removably coupled to the projections, over the arm 214 of the pivot pin interface 213, to prevent the pivot pin interface 213 from moving laterally outward from the rear pivot 311. The bracket 214 can be fixed to the projections via bolts, rivets, or welding as non-limiting examples.

The bottom 35 of the dump body 30 can include the plurality of flat contact surfaces 301, such as shown in FIG. 4 and FIG. 5. The flat contact surfaces 301 can be provided generally at a middle portion of the dump body 30. In a top plan view of the dump body 30, the pair of flat contact surfaces 301 can be between the rear pivot support 310 and the pair of vertical support structures 370. Additionally, the flat contact surfaces 301 can be provided on corresponding longitudinal support body members 377. For instance, the flat contact surfaces 301 can be provided on inward-facing surfaces of the longitudinal support body members 377. Thus, in embodiments of the disclosed subject matter, the flat contact surfaces 301 can be vertically-oriented, such as shown in FIG. 4 and FIG. 5. Moreover, the flat contact surface 301 on one longitudinal support body member 377 can be spaced apart from the flat contact surface 301 on the opposing longitudinal support body member 377 in the width direction of the dump body 30. Hence, FIG. 4 and FIG. 5 show only one flat contact surface 301 (though this surface may including multiple flat contact surface portions as discussed below), the other being provided on the inward-facing surface of the near longitudinal support body member 377. The flat contact surfaces 301 can be coupled to the longitudinal support body members 377, for instance, by welding, rivets, or bolts, as non-limiting examples.

According to one or more embodiments, each flat contact surface 301 can be comprised of a first flat contact surface portion and a second flat contact surface portion spaced from the first flat contact surface portion in the length direction of the dump body 30, such as shown in FIG. 5. Optionally, the first and second flat contact surface portions of the flat contact surface 301 may be of the same configuration. Of course, each flat contact surface 301, according to one or more embodiments of the disclosed subject matter, may be represented by a single flat contact surface (e.g., a single plate). For example, only one of the first or second flat contact surface portions shown in FIG. 8 may constitute the flat contact surface 301.

Figure 9:
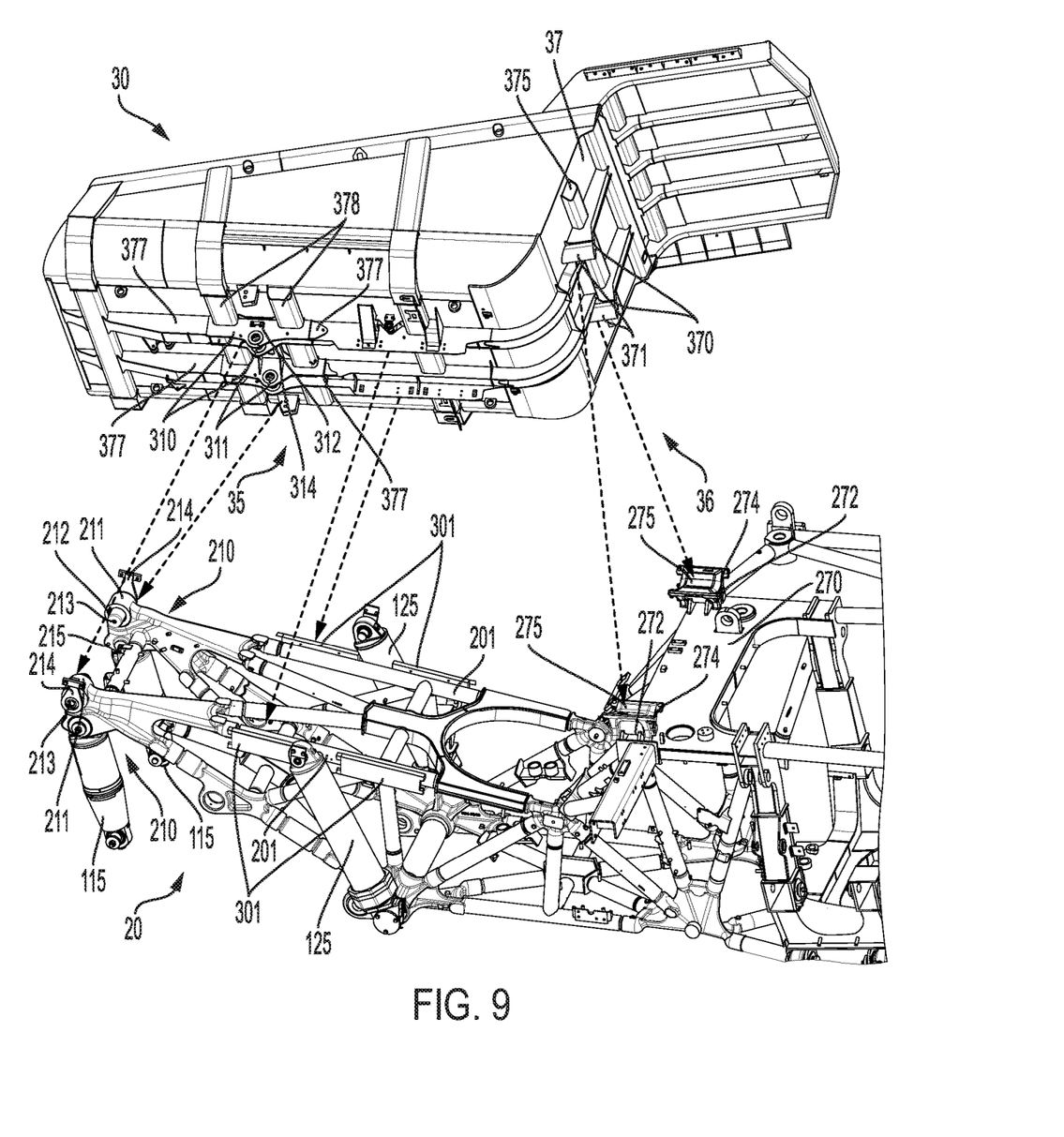
FIG. 9 is an exploded view of the space frame and dump body to show defined contact points according to embodiments of the disclosed subject matter.

Discussed in more detail below, when the dump body 30 is in a lowered position (i.e., rest position), the flat contact surfaces 301 attached to the dump body 30 can be positioned as shown in FIG. 9. That is, the flat contact surfaces 301 can be provided adjacent to outer or lateral sides of the outer elongate support members 201.

The vertical support structures 370 of the dump body 30 can extend from a front face of front wall 37 of the dump body 30. The vertical support structures 370 can be fixed to the front face of the front wall 37, for instance, via welding. The vertical support structures 370 can be spaced apart from each other in the width direction of the dump body 30. According to one or more embodiments, the vertical support structures 370 can be centered on opposite sides of a vertical centerline of the dump body 30 in a front view of the machine 10, such as shown in FIG. 2. The vertical support structures 370 can be as set forth in U.S. application Ser. No. 16/663,825 filed Oct. 25, 2019 (Case 19-0770), which is incorporated herein by reference in its entirety.

Vertical support structures 370 can be vertical in at least the front view of the dump body 30. Depending upon the configuration of the front wall 37 of the dump body 30, in a side view of the dump body 30 the vertical support structures 370 may be generally vertical, for instance, at an angle 10 degrees or less from vertical.

According to one or more embodiments, the vertical support structures 370 can extend through a horizontal support structure 375, which can also be fixed (e.g., welded) to the front face of the front wall 37. Intersecting surfaces of the horizontal support structure 375 and each vertical support structure 370 can be fixedly attached via welding, for instance. The horizontal support structure 375 can be as set forth in U.S. application Ser. No. 16/663,825 filed Oct. 25, 2019 (Case 19-0770), which, as noted above, is incorporated herein by reference in its entirety.

Each vertical support structure 370 can have a down-facing contact surface 371. According to one or more embodiments, the down-facing contact surface 371 can be convex, for instance, semi-cylindrical, elliptical, or multi-planar. The down-facing contact surfaces 371 can be configured to be received or seated in the upward-facing contact surfaces 275 of the support rockers 274. Unlike the support rockers 274, the vertical support structures 370, themselves, do not pivot.

INDUSTRIAL APPLICABILITY

As noted above, embodiments of the present disclosure relate to a finish machined rear pivot support assembly for a dump body of a haul truck, and systems, components, and method thereof.

The rear pivot support 310, particularly spaced-apart rear pivots 311 thereof, can be welded in line to respective longitudinal body support members 377. The rear pivot support 310 can be finish machined prior to assembly to the longitudinal body support members 377. For example, the pivot bores 315 can be finish machined prior to assembly of the rear pivot support 310 to the longitudinal body support members 377. Such finish machining can eliminate the need for line boring of the pivot bores 315 after assembly, since line boring may lead to reduced efficiency of a production cycle for the dump body 30.

The configuration of the dump body 30 on the space frame 20, which includes the rear pivot support 310 and corresponding connections, can provide a lightweight, durable machine configuration with a reliable support definition of load points between the dump body 30 and the space frame 20, for instance, in light of dimensional variations due to tolerances and/or component deflection.

Figure 8:
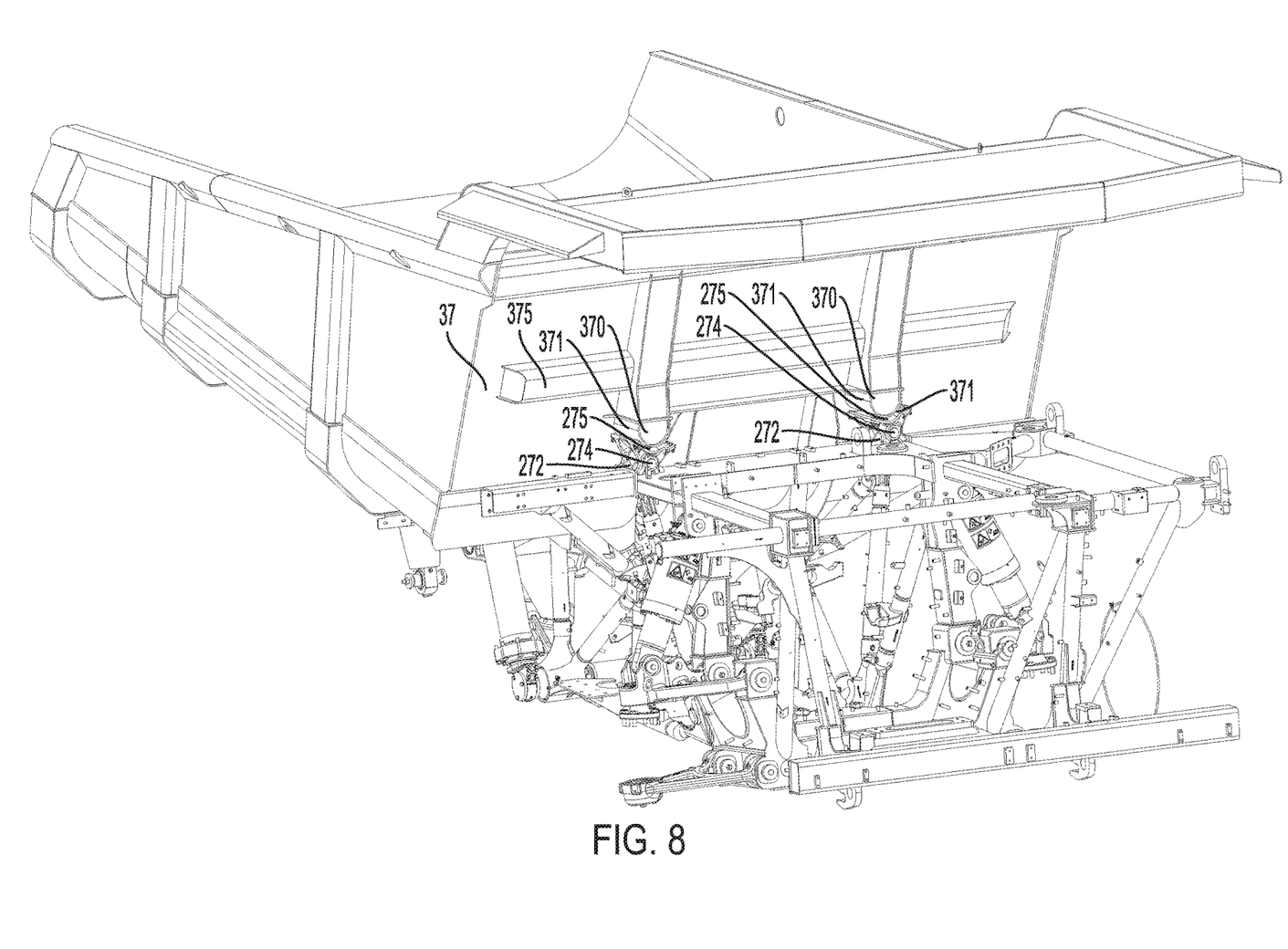
FIG. 8 is a front, side view of the dump body positioned on the space frame according to embodiments of the disclosed subject matter.

The dump body 30 can operatively contact the space frame 20 according to a predetermined contact arrangement. For example, a six-point contact arrangement between the dump body 30 and the space frame 20 may be provided. Such contact arrangement can be provided when the dump body 30 is in a rest position. Rest position as used herein can mean that the dump body 30 is in a lower-most position and not raised by the lift cylinders 125, which may be coupled to the center lower frame connections 220, such as shown in FIG. 8.

Referring to FIG. 9, which shows an exploded view of the space frame 20 and the dump body 30 of the machine 10, a first pair of contact points can be provided by the rear supports 211 of the space frame 20 and the rear pivots 311 of the rear pivot supports 310 of the dump body 30. Each rear support 211 can be pivotally connected to the dump body 30 via the rear pivot 311. Such connection can allow the front portion 36 of the dump body 30 to be raised and lowered between upper-most and lower-most positions via rotation about the common pivot axis created by the connection between the rear supports 211 and the rear pivots 311.

A second pair of contact points can be provided by the positioning of the flat contact surfaces 301 relative to the elongate support members 201. In particular, the flat contact surfaces 301, which notably can be on or part of the dump body 30 and not the space frame 20, can be provided adjacent to outer or lateral sides of the elongate support members 201, such as shown in FIG. 9. The flat contact surfaces 301 may be positioned parallel to the elongate support members 201. Additionally, according to one or more embodiments of the disclosed subject matter, the flat contact surfaces 301 can contact the elongate support members 201. Such positioning of the flat contact surfaces 301 can be when the dump body 30 is in the lower-most or rest position. Moreover, such positioning of the flat contact surfaces 301 can accommodate for lateral forces from the corresponding the elongate support members 201 of the space frame 20. Additionally, in that the flat contact surfaces 301 may have a chamfered portion on a bottom edge thereof, such chamfered portion can aid in the centering of the dump body 30 when the dump body 30 is transitioned to the rest or fully down position.

A third pair of contact points can be provided by the positioning of the vertical support structures 370, particularly the down-facing contact surfaces 371 thereof, removably on the support rockers 274, particularly the upward-facing contact surfaces 275 thereof. According to embodiments of the disclosed subject matter, the down-facing contact surface 371 can be removably seated on the upward-facing contact surface 275. Additionally, in a front view of the machine 10 a vertical centerline axis of the down-facing contact surface 371 of each of the vertical support structures 270 can be offset from the axis of rotation (i.e., pivot axis) of a corresponding one of the support rockers 274. For example, as shown in FIG. 2, the vertical centerline axis of the down-facing contact surface 371 can be offset inward in a width direction of the machine 10 relative to the axis of rotation for the support rocker 274.

The vertical support structures 370, particularly the down-facing contact surfaces 371 when contacting the upward-facing contact surfaces 275 of the support rockers 274, can transfer loading through the space frame 20 to the front suspension system and the front wheels 14. Moreover, the vertical support structures 370 can provide support for horizontal components of force vectors with respect to the dump body 30 load being transferred through the space frame 20 and the front suspension system to the front wheels 14. Additionally, because the support rockers 274 can pivot laterally and independently of each other, and because both the support rockers 274 and the vertical support structures 371 have cooperating contact surfaces (i.e., upward-facing contact surfaces 275 and down-facing contact surfaces 371, respectively), proper seating between the vertical support structures 371 and the support rockers 274 can be maintained, particularly when the dump body 30 is in the at-rest position, even when the machine 10 is moving, for instance. Such arrangement, as diagrammatically shown in FIG. 2, can thus provide an even load distribution LD with respect to each side of the support arrangement (i.e., side to side or laterally).

Additionally shown in FIG. 2, in a front view the support rocker 274/support vertical structure 270 combinations can be located along longitudinal axes of respective front struts 121 connected to respective front suspension members 120 on same sides of the space frame 20. For example, the pivot axis of the support rocker 274 may be aligned with a longitudinal axis a corresponding front strut 121. The longitudinal axes can intersect at a point $CL_1$ at a vertical centerline at a top of the dump body 30. Of course, embodiments of the disclosed subject matter are not so limited, and the longitudinal axis of the front strut 121 may not be aligned with the support rocker 271/support structure 270 combination, such as the pivot axis of the support rocker 274. Also shown in FIG. 2, longitudinal axes of additional suspension members on opposite sides of the space frame 20 can intersect at a point $CL_2$ at the same vertical centerline of the machine 10 as point $CL_1$. The arrangement of the third pair of contact points, therefore, can uniformly transfer load from the dump body 30 through the support rockers 274 and the space frame 20 to the front suspension system.

While aspects of the present disclosure have been particularly shown and described with reference to the embodiments above, it will be understood by those skilled in the art that various additional embodiments may be contemplated by the modification of the disclosed machines, assemblies, systems, and methods without departing from the spirit and scope of what is disclosed. Such embodiments should be understood to fall within the scope of the present disclosure as determined based upon the claims and any equivalents thereof

The invention claimed is:

1. A haul truck dump body having a length and a width and a top configured as a receptacle to receive hauling material, the haul truck dump body comprising:
   longitudinal body support members provided on a bottom of the haul truck dump body, the longitudinal body support members being spaced apart from each other in a width direction of the haul truck dump body and running parallel to each other in a length direction of the haul truck dump body from a front portion of the haul truck dump body to a rear portion of the haul truck dump body;
   transverse body support members provided on the bottom of the haul truck dump body, the transverse body support members being spaced apart from each other in the length direction of the haul truck dump body and running in the width direction of the haul truck dump from a first side of the haul truck dump body to a second side of the haul truck dump body opposite the first side, the transverse body support members running perpendicular to the longitudinal body support members; and
   a finish machined rear pivot support welded in-line with the longitudinal body support members, wherein the finish machined rear pivot support includes:
      a pair of rear pivots spaced apart from each other in the width direction of the haul truck dump body, the rear pivots being respectively welded in-line with the longitudinal body support members, and
      a cross-member provided between the rear pivots and the transverse body support members, the cross member being welded to inward-facing sides of the rear pivots and running parallel to the transverse body support members.

2. The haul truck dump body of claim 1, wherein each one of the rear pivots includes two cut-outs spaced from each other in the length direction of the haul truck dump body, and wherein each of the two cut-outs extends around a corresponding one of the transverse body support members so as to surround three sides of the transverse body support member and contact the bottom of the haul truck dump body on opposite sides of the transverse body support member.

3. The haul truck dump body of claim 1, wherein the finish machined rear pivot support is symmetrical in a front view and/or a side view.

4. The haul truck dump body of claim 1, wherein each said rear pivot includes a pair of pivot bores spaced from each other in the width direction of the haul truck dump body, a space between the pivot bores being configured to receive a rear frame connection of a space frame on which the haul truck dump body is operatively positioned.

5. The haul truck dump body of claim 1, wherein the finish machined rear pivot support is configured to be pivotally coupled to rear frame connections of a space frame on which the haul truck dump body is operatively positioned.

6. The haul truck dump body of claim 1, wherein the finish machined rear pivot support includes a pair of attachment interfaces on outward-facing sides of the rear pivots, each said attachment interface being configured to be coupled to a pivot pin interface connecting the finish machined rear pivot support to a rear frame connection of a space frame on which the haul truck dump body is operatively positioned.

7. The haul truck dump body of claim 1, wherein the cross-member includes a base and a pair of braces spaced apart from each other in the length direction of the haul truck dump body and extending from a first side of the base, and wherein opposite ends of the base of the cross-member extend under the rear pivots.

8. The haul truck dump body of claim 7, wherein each of the rear pivot includes two cut-outs spaced from each other in the length direction of the haul truck dump body, and wherein the opposite ends of the base of the cross-member are between the two cut-outs of the rear pivots.

9. The haul truck dump body of claim 7, wherein a second side of the base opposite the first side is flat and contacts the bottom of the haul truck dump body.

10. A finish machined rear pivot support comprising:
    a pair of rear pivots spaced apart from each other in a first direction, the rear pivots being configured to be respectively welded in-line with longitudinal body support members on a bottom of a dump body; and a cross-member extending in the first direction between the rear pivots, the cross-member being welded to inward-facing sides of the rear pivots, wherein each said rear pivot includes two cut-outs spaced from each other in a second direction perpendicular to the first direction, and wherein the two cut-outs of each of the rear pivots are provided on opposite sides of the cross-member in a side view of the finish machined rear pivot support.

11. The finish machined rear pivot support of claim 10, wherein each of the cut-outs is configured to extend around a corresponding transverse body support member on the bottom of the dump body.

12. The finish machined rear pivot support of claim 10, wherein the finish machined rear pivot support is symmetrical in a front view and/or the side view thereof.

13. The finish machined rear pivot support of claim 10, wherein each said rear pivot includes a pair of pivot bores spaced from each other in the first direction, a space between the pivot bores being configured to receive a rear frame connection of a space frame.

14. The finish machined rear pivot support of claim 10, wherein the finish machined rear pivot support includes a pair of attachment interfaces on outward-facing sides of the rear pivots, each said attachment interface being configured to be coupled to a pivot pin interface connecting the finish machined rear pivot support to a rear frame connection of a space frame.

15. The finish machined rear pivot support of claim 10,
wherein the cross-member includes a base and a pair of braces spaced apart from each other in the second direction and extending from a first side of the base, and wherein opposite ends of the base extend under the rear pivots.

16. The finish machined rear pivot support of claim 15, wherein the opposite ends of the base of the cross-member are between the two cut-outs of the rear pivots.

17. The finish machined rear pivot support of claim 15, wherein a second side of the base opposite the first side is flat and configured to be in contact with the bottom of the dump body.

18. A method comprising:
providing a dump body having a top configured as a receptacle to receive hauling material, the dump body including:
 a pair of longitudinal body support members provided on a bottom of the dump body, the longitudinal body support members being spaced apart from each other in a width direction of the dump body and running from a front portion of the dump body to a rear portion of the dump body, and
 a pair of transverse body support members provided on the bottom of the dump body, the transverse body support members being spaced apart from each other in a length direction of the dump body and running in the width direction of the dump body from a first side of the dump body to a second side of the dump body opposite the first side;
providing a finish machined rear pivot support including:
 a pair of rear pivots spaced apart from each other in the width direction of the dump body, and
 a cross-member provided between the rear pivots and the transverse body support members; and
welding the provided finish machined rear pivot support in line with the longitudinal body support members,
wherein the rear pivots of the finish machined rear pivot support, at the time of welding the finish machined rear pivot support in line with the longitudinal body support members, each has a pivot bore configured to pivotally connect a rear frame connection of a space frame on which the dump body is to be operatively positioned.

19. The method of claim 18, wherein the finish machined rear pivot support is welded such that a base of the cross-member contacts the bottom of the dump body and the transverse body support members are provided in corresponding cut-outs of the rear pivots.

20. The method of claim 18, further comprising pivotally coupling the finish machined rear pivot support to the rear frame connections of the space frame.

* * * * *